(12) United States Patent
Kim et al.

(10) Patent No.: US 11,673,611 B2
(45) Date of Patent: Jun. 13, 2023

(54) FRONT STRUCTURE FOR VEHICLE

(71) Applicants: Hyundai Motor Company, Seoul (KR); Kia Corporation, Seoul (KR)

(72) Inventors: Chan Su Kim, Seoul (KR); Hyung Tae Kim, Seoul (KR)

(73) Assignees: Hyundai Motor Company, Seoul (KR); Kia Coporation, Seoul (KR)

( * ) Notice: Subject to any disclaimer, the term of this patent is extended or adjusted under 35 U.S.C. 154(b) by 6 days.

(21) Appl. No.: 17/508,099

(22) Filed: Oct. 22, 2021

(65) Prior Publication Data

US 2022/0306206 A1 Sep. 29, 2022

(30) Foreign Application Priority Data

Mar. 26, 2021 (KR) ........................ 10-2021-0039232

(51) Int. Cl.
```
B62D 25/08      (2006.01)
B62D 27/02      (2006.01)
B62D 21/15      (2006.01)
B62D 65/02      (2006.01)
B62D 21/11      (2006.01)
```
(52) U.S. Cl.
CPC .............. *B62D 25/08* (2013.01); *B62D 21/11* (2013.01); *B62D 21/152* (2013.01); *B62D 25/082* (2013.01); *B62D 25/085* (2013.01); *B62D 27/023* (2013.01); *B62D 65/024* (2013.01)

(58) Field of Classification Search
CPC .. B62D 25/085; B62D 27/023; B62D 27/065; B62D 21/152; B62D 25/08; B62D 25/082; B60Y 2306/01

USPC ......... 296/203.01, 2, 193.2, 4, 9, 0.1, 29, 30
See application file for complete search history.

(56) References Cited

U.S. PATENT DOCUMENTS

| | | | |
|---|---|---|---|
| 4,542,934 A * | 9/1985 | Komatsu | B62D 25/082 296/203.02 |
| 9,725,122 B2 * | 8/2017 | Kim | B62D 25/082 |
| 10,071,768 B2 * | 9/2018 | Yasuhara | B60K 6/20 |
| 2016/0090126 A1 | 3/2016 | Min et al. | |

FOREIGN PATENT DOCUMENTS

KR          101534751 B1    7/2015

* cited by examiner

*Primary Examiner* — Dennis H Pedder
(74) *Attorney, Agent, or Firm* — Slater Matsil, LLP (57) ABSTRACT

An embodiment structure for a vehicle includes a front-end module carrier, a front side member, a fender apron assembly disposed on an upper portion of the front side member, and connecting members connecting the front-end module carrier and the fender apron assembly. Another embodiment structure for a vehicle includes a front side member, a front-end module carrier, a fender apron assembly disposed on an upper portion of the front side member, the fender apron assembly including a shock absorber housing coupled to the upper portion of the front side member, and connecting members connecting the front-end module carrier and the fender apron assembly, the connecting members including a lower connecting member extending from the front-end module carrier and connecting the shock absorber housing and the front side member.

18 Claims, 10 Drawing Sheets

FRONT STRUCTURE FOR VEHICLE

CROSS-REFERENCE TO RELATED APPLICATIONS

This application claims the benefit of Korean Patent Application No. 10-2021-0039232, filed on Mar. 26, 2021, which application is hereby incorporated herein by reference.

TECHNICAL FIELD

The present disclosure relates to a front structure for a vehicle.

BACKGROUND

In order to minimize damage to a vehicle and protect an occupant in the vehicle from an impact force applied due to a collision of the vehicle, it is critical for a vehicle body to have a load path which is a route along which a collision load is dispersed.

Figure 1:
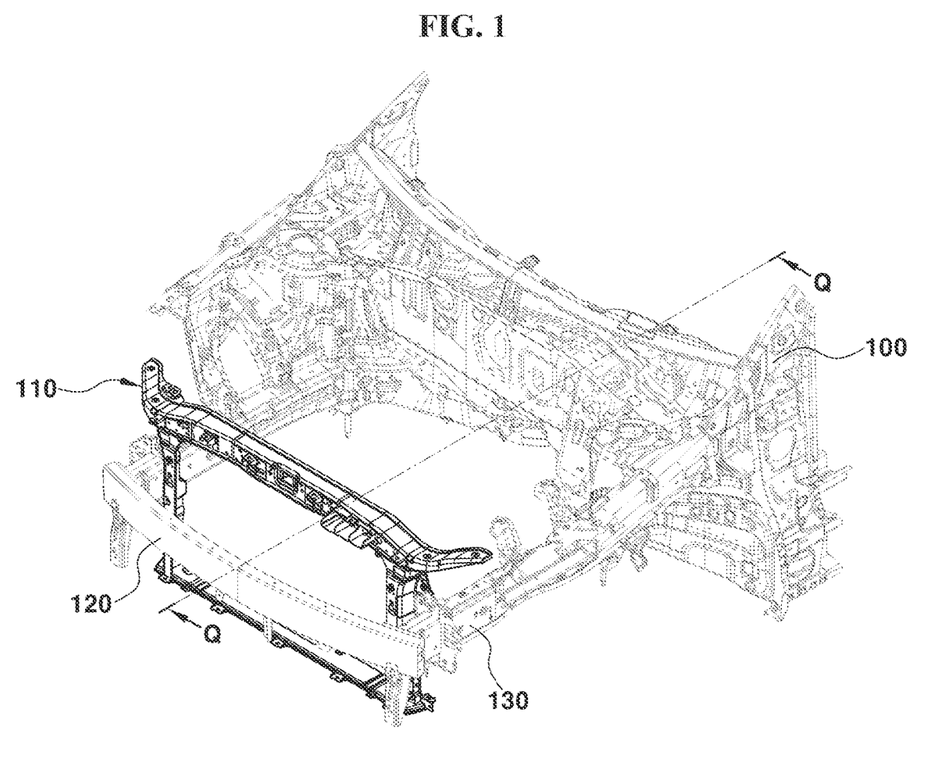
FIG. 1 is a view illustrating a front side of a vehicle body of a vehicle.
Figure 2:
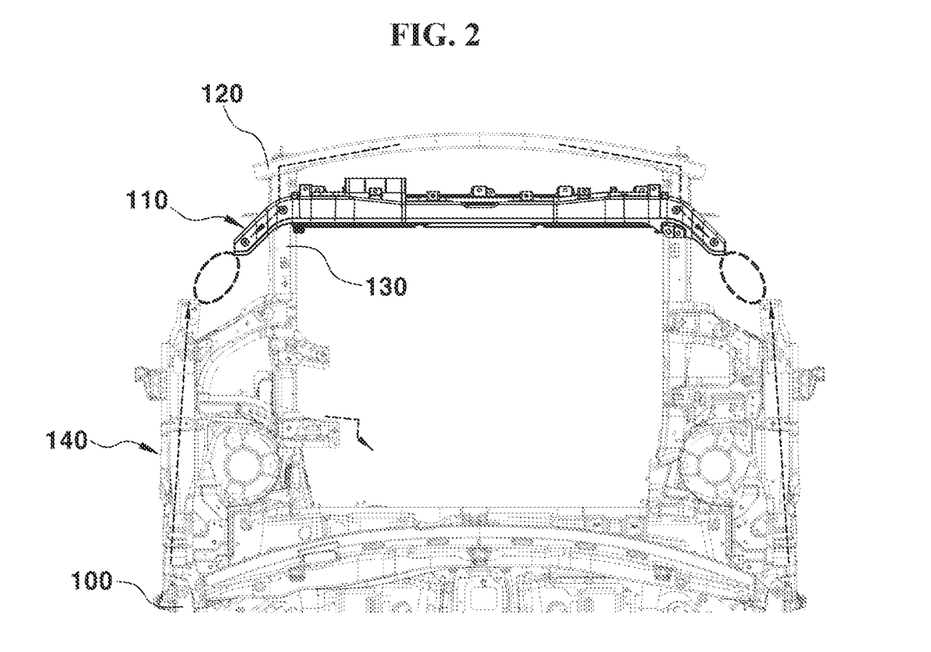
FIG. 2 is a top plan view of FIG. 1.

Recently, various headlamp designs are applied to some vehicles that make it difficult to provide a load path in a front portion of the vehicle. Referring to FIGS. 1 and 2, a front-end module is mounted on a front portion of a vehicle body 100. The front-end module includes a front-end module carrier 110, and components, such as headlamps, a bumper back beam, and a radiator, are mounted on the front-end module carrier 110.

A front bumper (not illustrated) is disposed in front of the front-end module and the front-end module carrier 110 and absorbs impact applied from the front portion of the vehicle. A bumper back beam 120 framing a structure of the front bumper is coupled to the front-end module carrier 110 and interposed between the front bumper and the front-end module. Further, front side members 130 are coupled to both sides of the front-end module, respectively, and fender apron assemblies 140 are disposed on upper portions of the front side members 130, respectively.

Figure 3A:
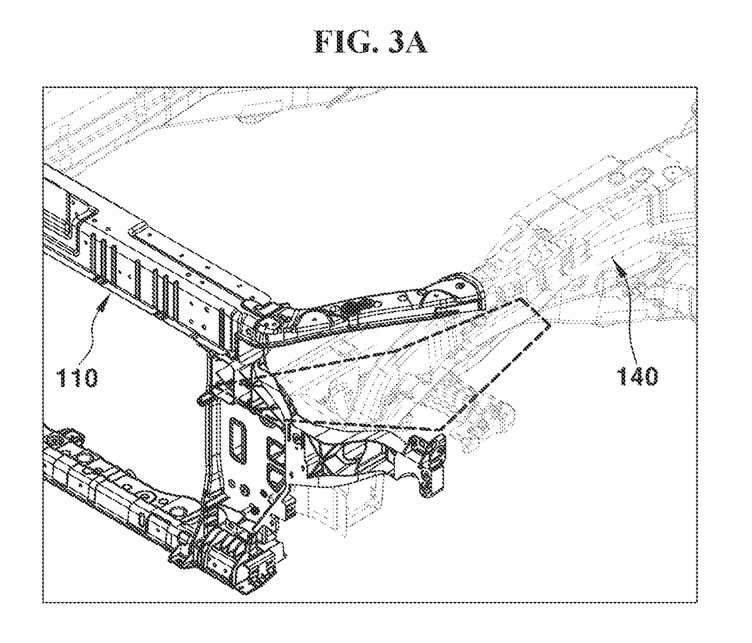
FIGS. 3A and 3B are views exemplarily illustrating a driver seat side of the front side of the vehicle body.
Figure 3B:
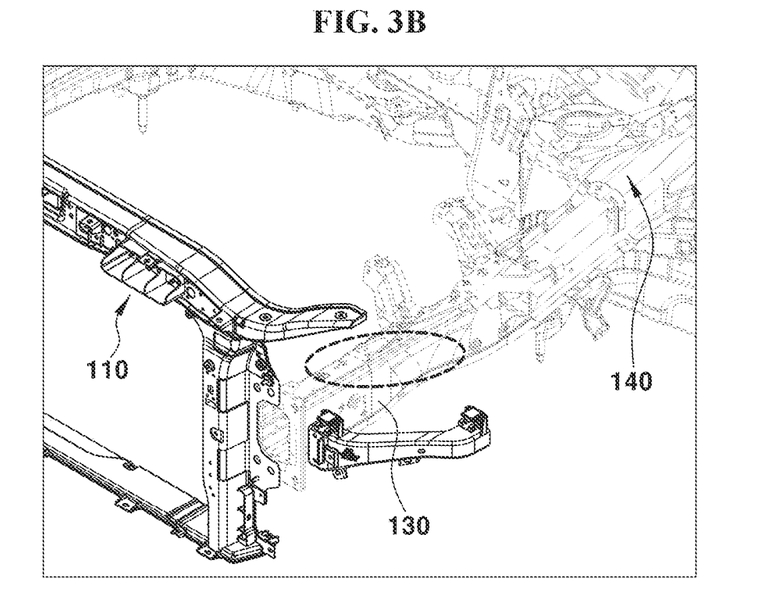

As illustrated in FIG. 3A, in case of the vehicle body 100 in the related art, a rigid structure is not discontinued between the front-end module carrier 110 and the fender apron assembly 140. Also, an upper load path of the vehicle body 100 in the related art is transmitted to two outer sides of the upper member 112 positioned at an upper end of the front-end module carrier 110 and dispersed to the fender apron assembly 140. However, recently, due to a restriction on layouts, such as headlamp designs, there are disconnected rigid structures as the regions indicated by the dotted lines in FIGS. 2A and 3B. As a result, there are types of vehicles that cannot generate the upper load paths.

Strut bars are sometimes additionally mounted on high-end vehicles and sports vehicles in order to generate the upper load paths. In these vehicles, the strut bars may be connected in accordance with an increase in target ride and handling (R&H) performance, such as roll damping and rough-road body behavior, thereby improving lateral bending rigidity. However, because it is difficult to form cross sections at each end on which the strut bar is mounted, the performance in relation to a collision is insufficient.

Korean Patent No. 10-1534751 (registered on Jul. 1, 2015) describes information related to the present disclosure.

The above information disclosed in this Background section is only for enhancement of understanding of the background of the invention and therefore it may contain information that does not form the prior art that is already known to a person of ordinary skill in the art.

SUMMARY

The present disclosure relates to a front structure for a vehicle. Particular embodiments relate to a front structure for a vehicle capable of effectively dispersing an impact load in the event of a frontal collision of a vehicle.

Embodiments of the present disclosure provide a front structure for a vehicle, which has improved performance in relation to rigidity and a collision of a vehicle.

Embodiments of the present disclosure provide a front structure for a vehicle, which has a rigid connection structure at a front side of a vehicle without being limited by design elements, such as headlamp designs of the vehicle.

Embodiments of the present disclosure provide a front structure for a vehicle, which has NVH performance improved by ensuring torsional rigidity and dynamic stiffness of a vehicle body.

Embodiments of the present disclosure are not limited to the above-mentioned embodiments, and other embodiments, which are not mentioned above, may be clearly understood from the following descriptions by those with ordinary skill in the art (hereinafter, referred to as 'those skilled in the art') to which the present disclosure pertains.

The features of embodiments of the present disclosure for achieving the above-mentioned embodiments of the present disclosure and carrying out the characteristic functions of embodiments of the present disclosure to be described below are as follows.

In one embodiment, the present disclosure provides a front structure for a vehicle, the front structure including connecting members configured to connect a front-end module carrier and a fender apron assembly disposed on an upper portion of a front side member.

According to embodiments of the present disclosure, there is provided the front structure for a vehicle, which has improved performance in relation to rigidity and a collision of the vehicle.

According to embodiments of the present disclosure, there is provided the front structure for a vehicle, which has a rigid connection structure at a front side of the vehicle without being limited by design elements, such as headlamp designs of the vehicle.

According to embodiments of the present disclosure, there is provided the front structure for a vehicle, which has NVH performance improved by ensuring torsional rigidity and dynamic stiffness of the vehicle body.

The embodiments of the present disclosure are not limited to the above-mentioned embodiments, and the other embodiments, which are not mentioned above, will be clearly understood by those skilled in the art from the following description.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of embodiments of the invention are discussed infra.

BRIEF DESCRIPTION OF THE DRAWINGS

The above and other features of embodiments of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of embodiments of the invention. The specific design features of embodiments of the present disclosure as disclosed herein, including, for example, specific dimensions, orientations, locations, and shapes will be determined in part by the particular intended application and use environment.

In the figures, reference numbers refer to the same or equivalent parts of embodiments of the present disclosure throughout the several figures of the drawings.

DETAILED DESCRIPTION OF ILLUSTRATIVE EMBODIMENTS

Hereinafter, preferred embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Recently, in some instances, rigid connection in a vehicle body is disconnected as headlamp designs are variously changed. Embodiments of the present disclosure provide a front structure for a vehicle, which is capable of overcoming a restriction, which is caused by design elements, by avoiding a design region, such as a headlamp.

In case of an electric vehicle, idle or acceleration noise, which is generated from an engine, has disappeared, unlike an engine vehicle in the related art. Therefore, it is necessary to reduce load noise more greatly than in the related art. The front structure for a vehicle according to embodiments of the present disclosure, designed to maintain torsional rigidity and dynamic stiffness of a vehicle body, may provide improved NVH (Noise, Vibration, and Harshness) performance.

Hereinafter, embodiments of the present disclosure will be described in detail with reference to the accompanying drawings.

Figure 4:
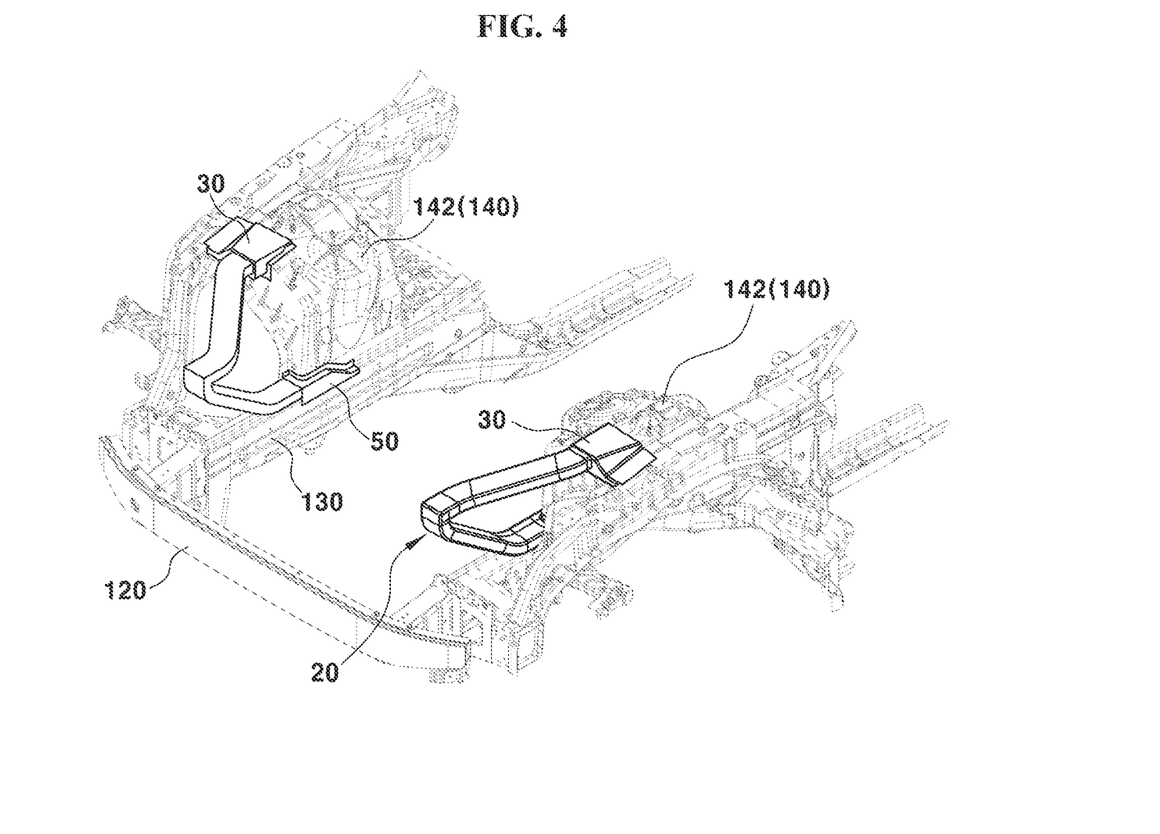
FIG. 4 is a view illustrating a front structure for a vehicle according to embodiments of the present disclosure with a front-end module omitted.
Figure 5:
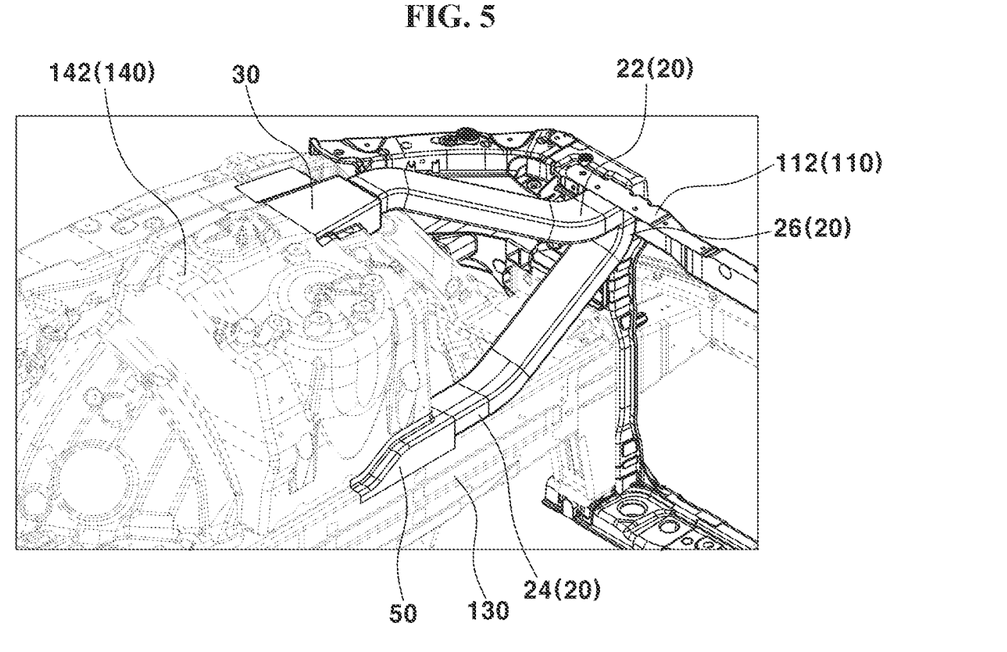
FIG. 5 is a view illustrating the front structure for a vehicle according to embodiments of the present disclosure at a driver seat side of a front side of a vehicle body.
Figure 6:
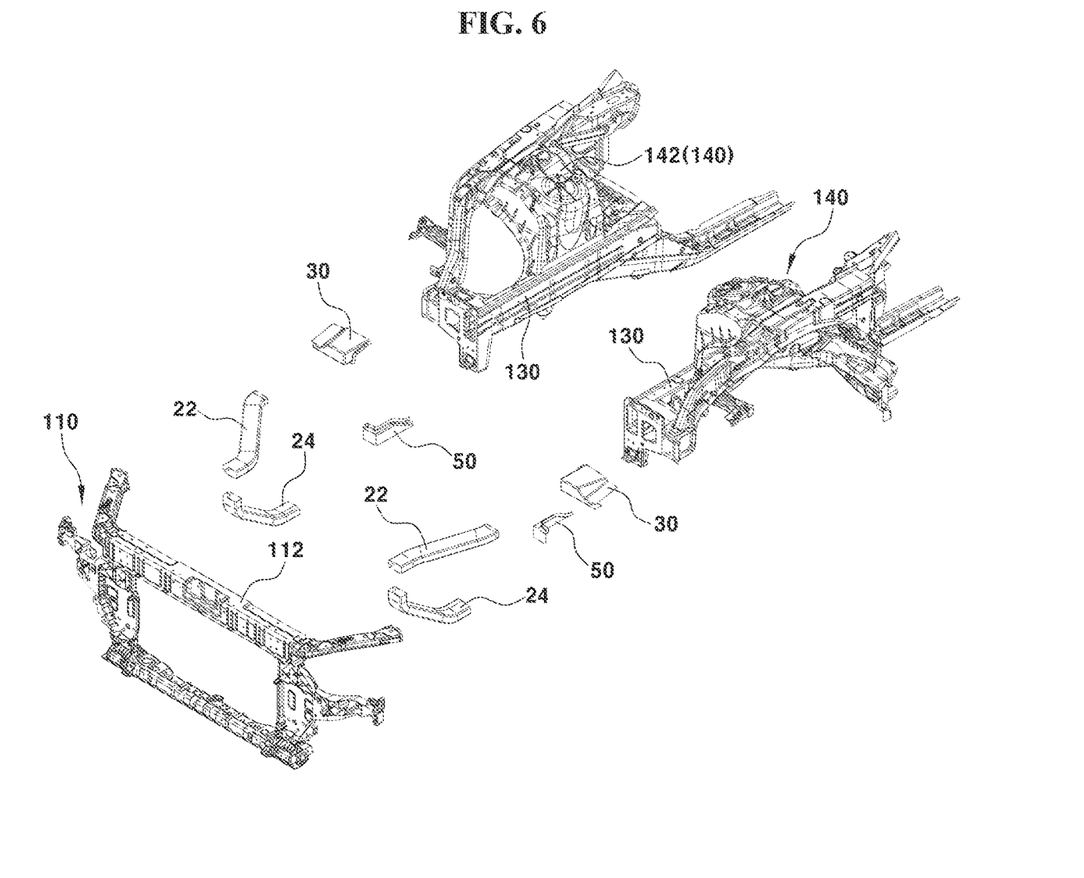
FIG. 6 is an exploded perspective view of the front structure for a vehicle according to embodiments of the present disclosure.

As illustrated in FIGS. 4 to 6, the front structure for a vehicle according to embodiments of the present disclosure includes connecting members 20.

The connecting members 20 are configured to connect a front-end module carrier no and a fender apron assembly 140 of a vehicle. In particular, the connecting members 20 connect an upper member 112 of the front-end module carrier 110 and the fender apron assembly 140. According to embodiments of the present disclosure, when the upper member 112 is used as a member used for a load path, an optimal connecting structure can be constructed by reducing the number of components and a weight.

A front side member 130 is coupled to the front-end module carrier 110. The front side member 130 extends from the front-end module carrier 110 rearward or toward a rear side of the vehicle. A shock absorber housing 142 of the fender apron assembly 140 is seated on an upper portion of the front side member 130 extending rearward. Therefore, the front-end module carrier 110 and the shock absorber housing 142 are spaced apart from each other in a longitudinal direction of the vehicle. According to an embodiment of the present disclosure, the connecting members 20 include an upper connecting member 22 and a lower connecting member 24.

The upper connecting member 22 connects the front-end module carrier 110 with the shock absorber housing 142 of the fender apron assembly 140. More specifically, one side of the upper connecting member 22 is connected to the front-end module carrier 110 or the upper member 112, and the other side of the upper connecting member 22 is connected to an upper portion of the shock absorber housing 142.

Figure 7A:
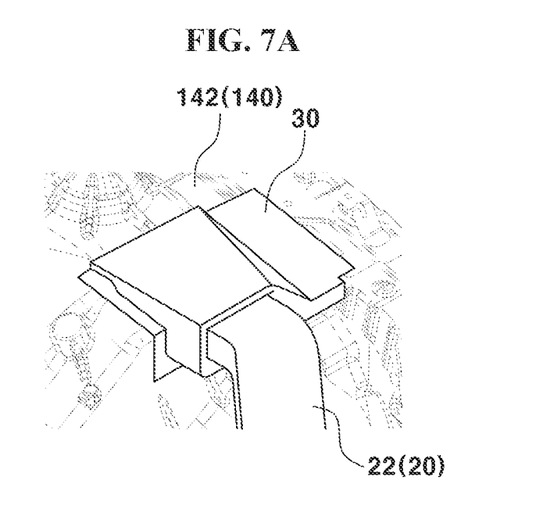
FIG. 7A is a partially enlarged view of an upper gusset of the front structure for a vehicle according to embodiments of the present disclosure.

As illustrated in FIG. 7A, according to the embodiment of the present disclosure, the upper connecting member 22 is coupled to the shock absorber housing 142 by an upper gusset 30. The upper gusset 30 serves as a reinforcing element for improving a coupling force between the upper connecting member 22 and the shock absorber housing 142.

The lower connecting member 24 extends from the front-end module carrier 110 and connects the shock absorber housing 142 and the front side member 130. One side of the lower connecting member 24 is coupled to the front-end module carrier 110 or the upper member 112, and the other side of the lower connecting member 24 is coupled to a joint portion between the shock absorber housing 142 and the front side member 130. That is, around the joint portion between the shock absorber housing 142 and the front side member 130, one part of the lower connecting member 24 is connected to the shock absorber housing 142, and the other part of the lower connecting member 24 is connected to the front side member 130.

Figure 7B:
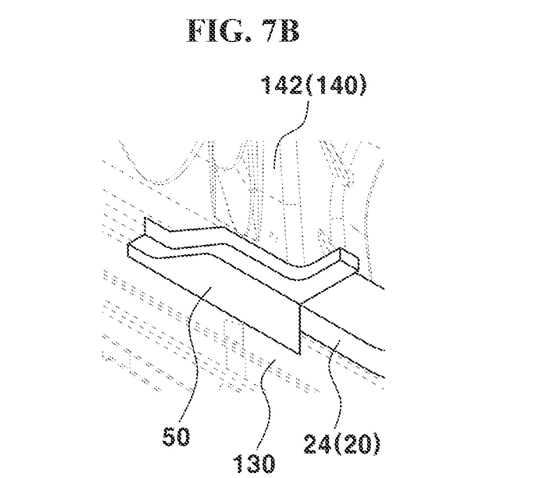
FIG. 7B is a partially enlarged view of a lower gusset of the front structure for a vehicle according to embodiments of the present disclosure.

As illustrated in FIG. 7B, according to the embodiment of the present disclosure, the lower connecting member 24 is coupled to the shock absorber housing 142 and the front side member 130 by the lower gusset 50. As the upper gusset 30, the lower gusset 50 serves as a reinforcing element for improving a coupling force between the lower connecting member 24, the shock absorber housing 142, and the front side member 130.

The upper connecting member 22 and the lower connecting member 24 are connected to each other by a link part 26. The link part 26 may be formed by bending the connecting member 20. The link part 26 is an end at which the upper connecting member 22 and the lower connecting member 24 are coupled to the front-end module carrier 110. That is, the link part 26 is coupled to the front-end module carrier 110. The upper connecting member 22 branches off from the link part 26 and extends upward from the link part 26. The lower connecting member 24 extends downward from the link part 26.

According to an embodiment of the present disclosure, the lower connecting member 24 may be coupled by penetrating the upper connecting member 22. That is, a part of the lower connecting member 24 and a part of the upper connecting member 22 may become the link part 26 for connecting the upper connecting member 22 and the lower connecting member 24.

Figure 8A:
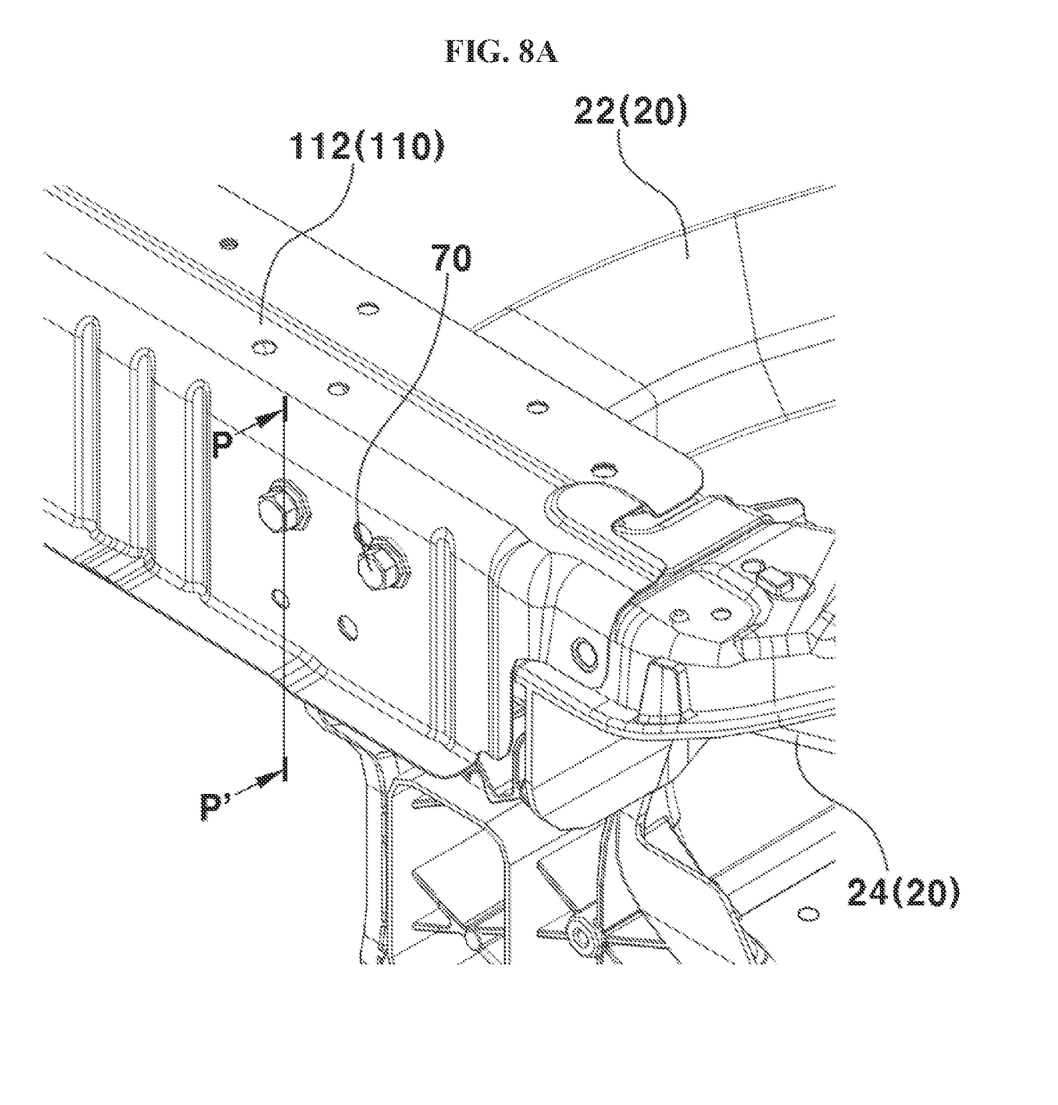
FIG. 8A is a view illustrating the front structure for a vehicle according to embodiments of the present disclosure when viewed from a location in front of the vehicle.
Figure 8B:
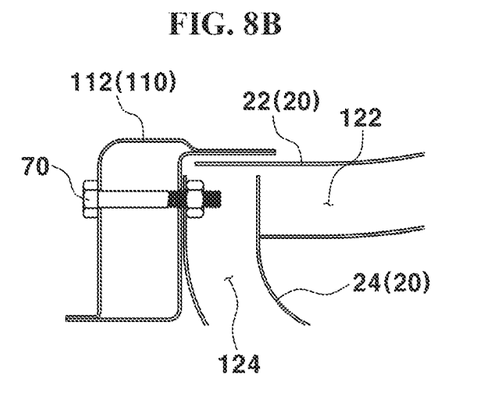
FIG. 8B is a cross-sectional view taken along line P-P' in FIG. 8A.

The connecting member 20 or the link part 26 is coupled to the upper member 112 of the front-end module carrier 110. In order to ensure connection between the front-end module carrier 110 and the vehicle body, the connecting member 20 and the front-end module carrier no are directly coupled to each other. To this end, according to the embodiment of the present disclosure, as illustrated in FIGS. 8A and 8B, the link part 26 may be coupled to the front-end module carrier 110 by a bolt 70. The bolt 70 penetrates the front-end module carrier 110 and further penetrates the connecting member 20, thereby directly fastening the front-end module carrier 110 and the connecting member 20. However, the method of coupling the connecting member 20 and the front-end module carrier 110 is not limited to the bolting, and other known methods may be adopted.

Continuing to refer to FIG. 8B, the connecting member 20 has a vacant cross section. An empty, first space 122 is provided in the upper connecting member 22, and an empty, second space 124 is provided in the lower connecting member 24. A closed cross section of the second space 124 is continuously formed from the first space 122 such that the entire connecting member 20 may have the cross section.

The cross section is formed as the first space 122 and the second space 124 communicate with each other at the link part 26. Therefore, according to embodiments of the present disclosure, the cross section may be formed on the portion of the vehicle on which the connecting member 20 is mounted. As described above, since one side of the connecting member 20 is connected to the vehicle through the link part 26 and the link part 26 has the cross section, the connecting member 20 may effectively serve as a collision member. In addition, the upper connecting member 22 and the lower connecting member 24 are coupled to the fender apron assembly 140 by the upper gusset 30 and the lower gusset 50, respectively, so the cross section may be formed even at the other end of the connecting member 20. Therefore, embodiments of the present disclosure may provide excellent performance in relation to a collision.

Figure 9A:
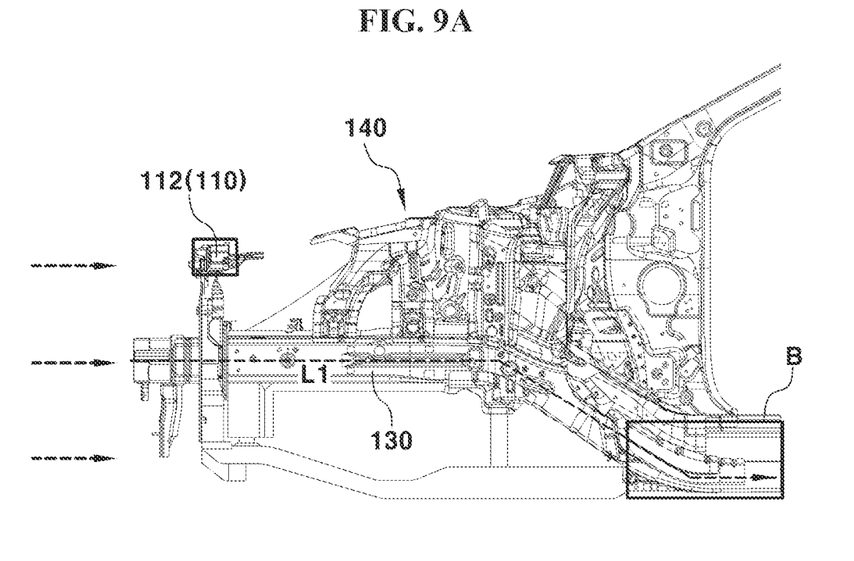
FIG. 9A is a view illustrating a front side of a vehicle body in the related art when viewed from line Q-Q in FIG. 1.

As illustrated in FIG. 9A, in the related art, because there is no element connected to the front-end module carrier 110, particularly, the upper member 112, the front-end module carrier 110 is vulnerable to an external load and vibration. It is necessary to ensure rigidity of front and rear portions of the front-end module carrier 110. According to embodiments of the present disclosure, as illustrated in FIG. 9B, the front-end module carrier 110 or the upper member 112 may be fastened directly to the vehicle body 10 by the connecting member 20, thereby ensuring rigidity of the front-end module carrier 110.

Figure 9B:
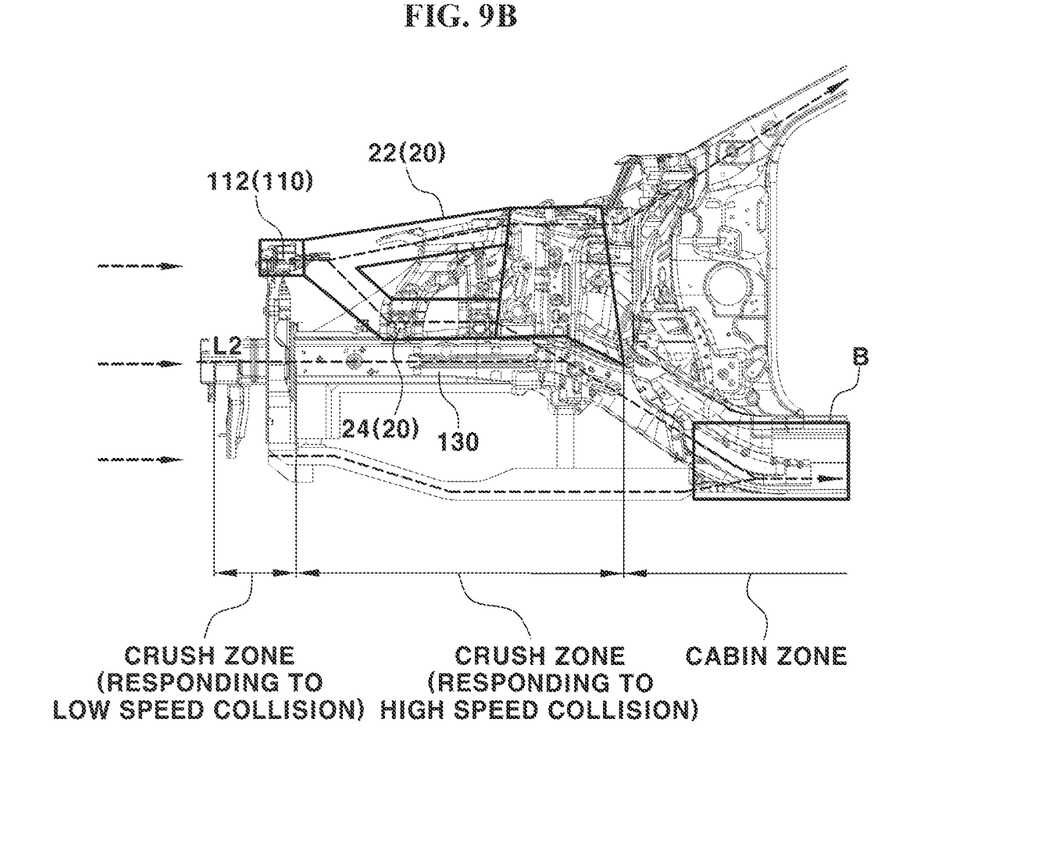
FIG. 9B is a view illustrating the front structure for a vehicle according to embodiments of the present disclosure when viewed from line Q-Q in FIG. 1.

Continuing to refer to FIGS. 9A and 9B, the front structure for a vehicle according to embodiments of the present disclosure may improve load dispersion from a vehicle, such as an electric vehicle including a high-voltage battery B. In the electric vehicle having the high-voltage battery B disposed at a lower side thereof, a load path L1 is formed only at a lower side of the vehicle body in a structure in the related art in which an upper load path is disconnected, as illustrated in FIG. 9A. Therefore, it is necessary to protect the high-voltage battery B. In contrast, as illustrated in FIG. 9B, according to embodiments of the present disclosure, it can be confirmed that a lower load path is formed and an upper load path is formed by the connecting members 20 to disperse a collision load in several directions (load path: L2). Therefore, embodiments of the present disclosure may sufficiently protect the high-voltage battery B, and the impact energy can be efficiently absorbed through dispersing loads in the crush zone designed to respond to a high-speed collision, thereby decreasing injury that may incur to an occupant of the vehicle.

Figure 10:
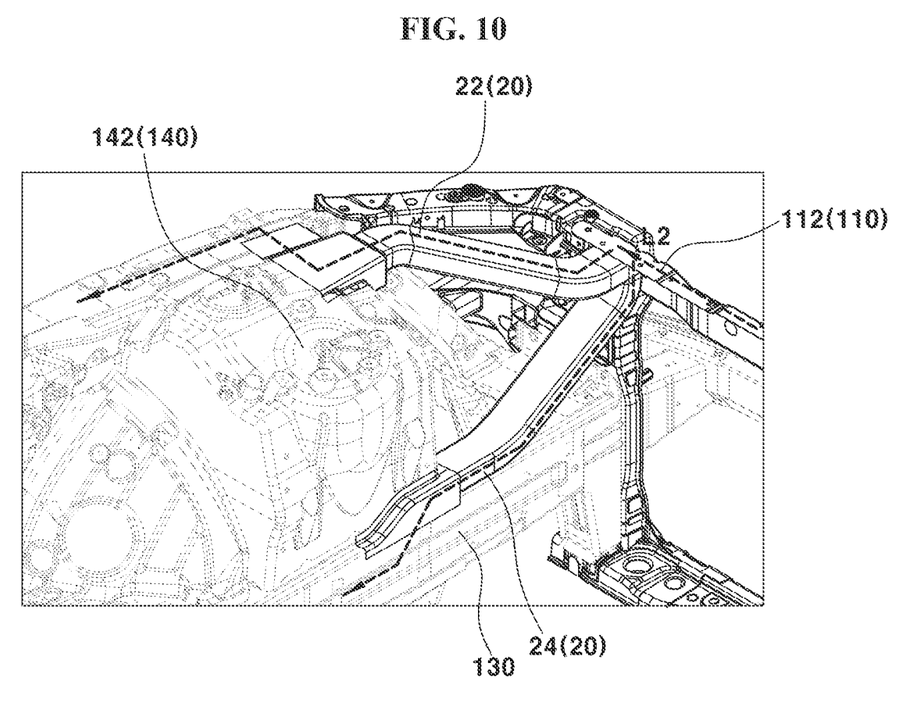
FIG. 10 is a view illustrating a load path L2 defined by the front structure for a vehicle according to embodiments of the present disclosure.

As illustrated in FIG. 10, the front structure for a vehicle according to embodiments of the present disclosure may enable rigid connection and effectively disperse a collision load in the event of a frontal collision. Since the load path, which is disconnected in the structure in the related art, is formed by the connecting members 20, a load may be effectively dispersed.

The present disclosure, which has been described above, is not limited by the aforementioned embodiments and the accompanying drawings, and it will be obvious to those skilled in the art to which the present disclosure pertains that various substitutions, modifications and alterations may be made without departing from the technical spirit of the present disclosure.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A structure for a vehicle, the structure comprising:
   a front-end module carrier;
   a front side member;
   a fender apron assembly disposed on an upper portion of the front side member, the fender apron assembly comprising a shock absorber housing coupled to the upper portion of the front side member; and
   connecting members connecting the front-end module carrier and the fender apron assembly, wherein the connecting members have a first end coupled to an upper portion of the shock absorber housing and a second end coupled to a lower portion of the shock absorber housing and the front side member, wherein an upper member of the front end module carrier is coupled between the first end and the second end of the connecting members.

2. The structure of claim 1, wherein the connecting members comprise an upper connecting member configured to connect the front-end module carrier and the shock absorber housing.

3. The structure of claim 2, wherein the upper connecting member is coupled to the shock absorber housing by an upper gusset.

4. The structure of claim 1, wherein the connecting members connect the fender apron assembly and the upper member provided on an upper portion of the front-end module carrier.

5. The structure of claim 4, wherein the connecting members are in contact with the upper member and fastened by bolting.

6. A structure for a vehicle, the structure comprising:
   a front side member;
   a front-end module carrier;
   a fender apron assembly disposed on an upper portion of the front side member, the fender apron assembly comprising a shock absorber housing coupled to the upper portion of the front side member; and
   connecting members connecting the front-end module carrier and the fender apron assembly, the connecting members comprising a lower connecting member extending from the front-end module carrier and connecting the shock absorber housing and the front side member and also comprising a link part coupled to an upper member disposed on an upper portion of the front-end module carrier, wherein the link part, an upper connecting member, and the lower connecting member have vacant spaces therein, respectively, that communicate with one another.

7. The structure of claim 6, wherein the lower connecting member is coupled to the shock absorber housing and the front side member by a lower gusset.

8. The structure of claim 6, wherein a bolt penetrating the link part and the upper member is fastened.

9. The structure of claim 6, wherein a first side of the link part extends to an upper connecting member and wherein a second side of the link part extends to the lower connecting member.

10. The structure of claim 6, wherein the lower connecting member is coupled by penetrating an upper connecting member.

11. A method of assembling a front structure for a vehicle, the method comprising:
    coupling a shock absorber housing of a fender apron assembly to an upper portion of a front side member; and
    connecting a front-end module carrier and the fender apron assembly with connecting members, wherein connecting of the front-end module carrier comprises:
       coupling a first end of the connecting members to an upper portion of the shock absorber housing;
       coupling a second end of the connecting members to a lower portion of the shock absorber housing and the front side member; and
       coupling an upper member of the front-end module carrier between the first end and the second end of the connecting members.

12. The method of claim 11, further comprising connecting an upper connecting member of the connecting members to the front-end module carrier and the shock absorber housing.

13. The method of claim 12, further comprising coupling the upper connecting member to the shock absorber housing by an upper gusset.

14. The method of claim 11, further comprising coupling a lower connecting member of the connecting members to the shock absorber housing and the front side member by a lower gusset.

15. The method of claim 11, wherein the upper member is provided on an upper portion of the front-end module carrier with the connecting members.

16. The method of claim 15, wherein the connecting members are in contact with the upper member and are fastened by bolting.

17. The structure of claim 1, wherein the connecting members provide rigid connection between the upper member of the front end module and the fender apron assembly.

18. The method of claim 11, wherein connecting the front-end module carrier and the fender apron assembly with connecting members comprises providing a rigid connection between the upper member of the front-end module carrier and the fender apron assembly.

* * * * *